(No Model.)
F. O. NORTON
FIGURE TOY.
No. 469,169. Patented Feb. 16, 1892.
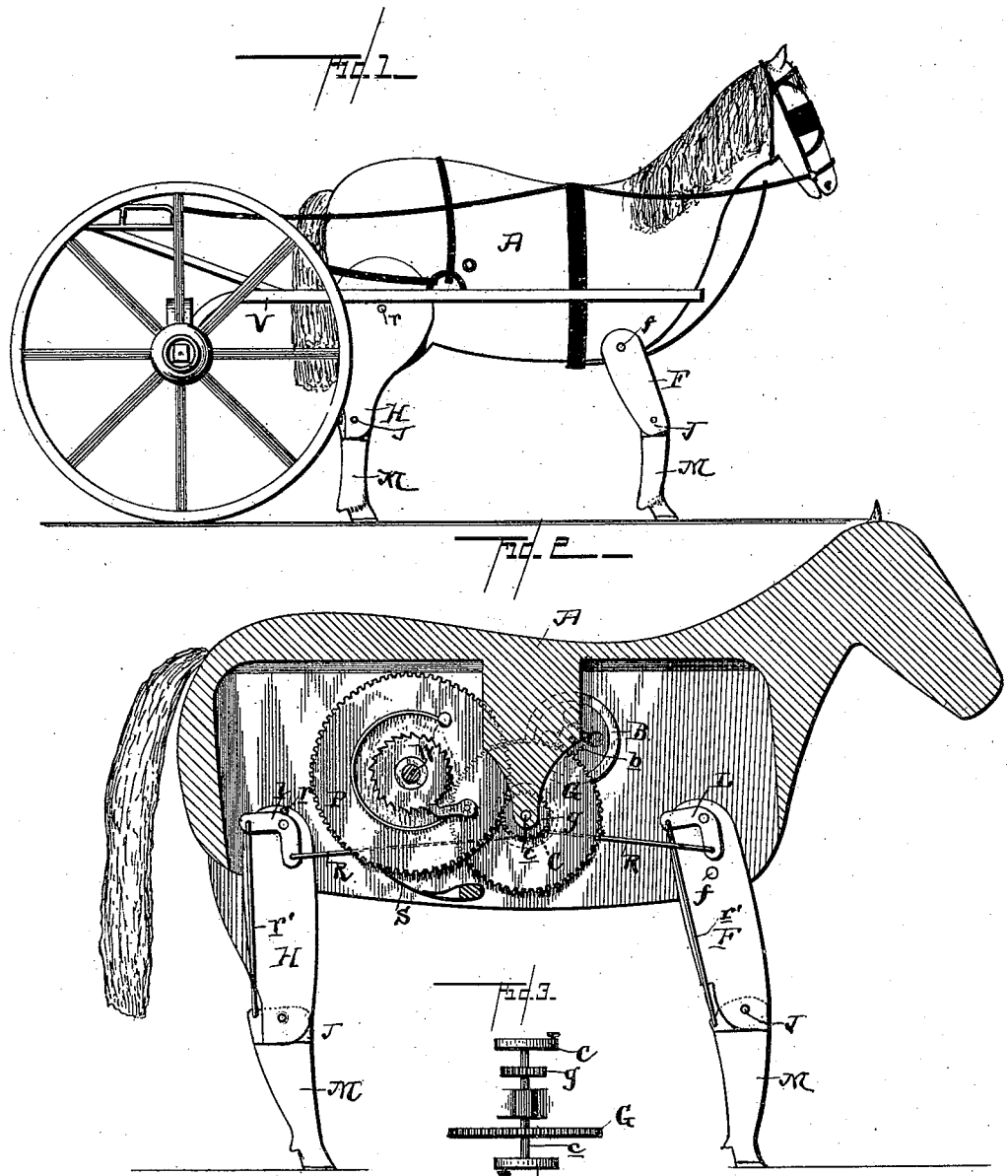
Witnesses
Inventor
Fred Otto Norton
By his Attorneys,

UNITED STATES PATENT OFFICE.

FRED OTTO NORTON, OF SILVER CITY, IDAHO.

FIGURE TOY.

SPECIFICATION forming part of Letters Patent No. 469,169, dated February 16, 1892.

Application filed April 24, 1891. Serial No. 390,313. (No model.)

*To all whom it may concern:*

Be it known that I, FRED OTTO NORTON, a citizen of the United States, residing at Silver City, in the county of Owyhee and State of Idaho, have invented a new and useful Toy Animal, of which the following is a specification.

This invention relates to games and toys, and more especially to such toys as are adapted to walk in imitation of natural life.

The object of the invention is to produce such a toy wherein the motions of quadrupeds having legs which act as do the horse's are imitated.

To this end the invention consists in the mechanical construction and arrangement of parts, as hereinafter more fully described and claimed, and as illustrated on the sheet of drawings, wherein—

Figure 1 is a side elevation of this improved toy in the shape of a horse hitched to a sulky. Fig. 2 is a central longitudinal section of the animal. Fig. 3 is a plan view of the crank-shaft.

Referring to the said drawings, the letter A designates in the present instance a horse, although obviously it could be any other animal whose legs move in the act of walking as do the horse's, but not the elephant and other similar animals, whose legs are differently jointed. The horse is of wood or other light material suitably painted and carved in imitation of the real animal, and of a size desired.

V is a vehicle hitched to the horse to keep him from falling sidewise as he walks, although it will be understood that if a team of these horses is made and the two are connected in any suitable manner the same end will be attained.

The letters F designate the fore and H the hind or rear legs of the animal, which legs have their respective pivots $f$ and $r$ in the body of the animal, as shown, and turn with some little friction on these pivots.

J J are knuckle-joints in the several legs, whereby the lower members M are connected with the upper, and are adapted to move as in natural life. These legs are operated by the mechanism best seen in Fig. 2.

S is a coiled spring mounted on a winding-pinion W, adapted to be wound with a key, as shown, and P is the power-gear keyed on this pinion. This gear intermeshes with a smaller one $g$ on a crank-shaft $c$, and this shaft carries a large gear G, which intermeshes with a gear $b$ on the shaft of a fly or balance wheel B, whereby the motion of the mechanism is rendered steady and the animal caused to walk more slowly and for a greater distance. Upon the ends of the shaft $c$ are cranks C C, which are connected by pitman-rods R with one end of bell-crank levers L and $l$, connected at their angles to the fore and hind legs, as shown. The levers L are pivoted to the fore legs above their pivots to the body, and the levers $l$ to the hind legs below their pivots, all on the inside of the body of the animal, and therefore completely out of sight. From the other ends of the levers L and $l$ other rods $r'$ lead downwardly in the rear of the upper members of the legs, and are connected to slight projections of the lower members M of the legs at points just in rear of the joints J.

With the above-described construction of parts the operation of this device will be as follows: The pinion W having been wound to store power in the spring S and the animal with his supporting device (the vehicle V or another animal) placed upon the floor or table, the operator releases him and the spring commences to unwind. In so unwinding it drives the shaft $c$, and the fly-wheel B rotates rapidly and controls the motion of the shaft $c$. The cranks C C at the ends of the latter impart reciprocating motion to the rods R, which is communicated to the levers L and $l$; but as these levers are respectively above the pivots of the fore legs and below the pivots of the hind legs the legs of the animal are differently moved and in exact imitation of the movements in natural life. Moreover, when any rod R is drawn upon the first motion it imparts is the proper movement of the lower member M of its leg around its joint J, (which is a loose pivot,) and afterward the entire leg is swung upon its pivot, ($r$ or $f$, which is a tighter pivot.) The opposite is also the case when the rods R are moved outwardly. Hence the result is—the lower members M moving through smaller arcs than the entire legs— that the whole leg is longer when it is moving to the rear than when it is moving forwardly.

The cranks C C are oppositely disposed with relation to the shaft c, and hence the two legs on one side of the animal move in opposite directions to those on the other, although of course, if preferred, these cranks could be set otherwise, according as the fancy of the manufacturer may elect.

The device is simple and inexpensive of construction, and yet it affords a correct imitation of nature. Considerable change in the details of construction can be made without departing from the spirit of my invention.

I claim as the salient features—

In a toy animal, the combination, with the body, a leg pivoted with some friction thereto, a bell-crank pivoted at its angle to said leg, a lower member knuckle-jointed to said leg and having a projection in rear of its joint, and a rod connecting said projection with one arm of the lever, of a spring-motor driving a shaft having a crank, and a pitman-rod connecting said crank with the other arm of the lever, as and for the purpose set forth.

In testimony that I claim the foregoing as my own I have hereto affixed my signature in presence of two witnesses.

FRED OTTO NORTON.

Witnesses:
A. F. STEVENS,
WILLIAM W. CHRISMAN.